United States Patent Office 3,447,999
Patented June 3, 1969

3,447,999
HIGH MOLECULAR POLYAMIDE SAFETY GLASS LAMINATE AND METHOD OF MANUFACTURE
Edgar R. Rogier, Minnetonka, Minn., and Fred E. Wiley, Longmeadow, Mass., assignors to General Mills, Inc., a corporation of Delaware
No Drawing. Filed Feb. 23, 1966, Ser. No. 529,237
Int. Cl. B32b 17/10; C03c 27/06; C09j 3/00
U.S. Cl. 161—197                  16 Claims This invention relates to a safety glass and in particular to a safety glass comprising two sheets of glass separated by a thermoplastic polyamide interlayer, the interlayer consisting essentially of a polymeric fat acid polyamide wherein the polymeric fat acid has dimeric fat acid content greater than 90% by weight.

Safety glass structures are well known commercially available items. Today, such structures generally have an interlayer of plasticized polyvinyl butyral. It has now been discovered that an interlayer of a polymeric fat acid polyamide prepared from polymeric fat acids having a dimeric fat acid content greater than 90% by weight, and preferably greater than 95%, provide a desirable safety glass unit. In general, such polyanides will possess significantly higher yield points and elongation than polyvinyl butyral.

The methods of making the safety glass structures are well known. Essentially, they consist in the application of heat and/or pressure to form a laminate comprising two sheets of glass with an interlayer interposed. In general, the heating is conducted to a point slightly above the melting point or softening point of the interlayer and upon cooling, a unitary safety glass structure is provided wherein the glass sheets are bonded together through the interlayer. Where pressure is applied, pressures up to 15,000 p.s.i. may be employed. The specific temperature to which heating is conducted is dependent on the softening point of the particular polyamide resin employed. With the polyamide resins of this invention, such heating will preferably be in the range of from about 75° C. to about 250 C.

The polyamide interlayer may be interposed in a variety of ways. For instance, the polyamide resin may be applied in a molten melt flowed on the glass sheet, by use of a sheet or film of the polyamide, by solvent solution, or in powder or granule form deposited on a glass sheet. The preferred manner of application is either the sheet or film technique or the ground powder or granule technique.

As indicated, the thermoplastic interlayers of the present invention are the polymeric fat acid polyamide resins prepared from polymeric fat acids having a dimeric fat acid content greater than 90% by weight and preferably greater than 95% by weight. These polyamide resins are prepared by conventional amidification processes which are well known. In general, in such amidification reaction the polyamide forming reactants are preferably heated to a temperature between 100 to 300° C. and the water of reaction is removed.

The polymeric fat acids are well known. A summary of the preparation thereof is found in U.S. Patent 3,157,681. Commercially available polymeric fat acids so prepared from tall oil fatty acids generally have a composition as follows:

| | Percent by weight |
|---|---|
| $C_{18}$ monobasic acids (monomer) | 5–15 |
| $C_{36}$ dibasic acids (dimer) | 60–80 |
| $C_{54}$ and higher polybasic acids (trimer) | 10–35 |

The relative ratios of monomer, dimer and trimer in such unfractionated polymeric fat acids are dependent on the nature of the starting material and the conditions of polymerization. For the purposes of this invention, the term "monomeric fat acids" refers to the unpolymerized monomeric acids, the term "dimeric fat acids" refers to the dimeric fat acids and the term "trimeric fat acids" refers to the residual higher polymeric forms consisting primarily of trimer acids but containing some higher polymeric forms. The term "polymeric fat acids" as used herein is intended to be generic to polymerized acids obtained from "fat acids" and consists of a mixture of monomeric, dimeric and trimeric fat acids. The term "fat acids" is intended to include saturated, ethylenically unsaturated and acetylenically unsaturated, naturally occurring and synthetic monocarboxylic aliphatic acids containing from 8 to 24 carbon atoms.

The saturated fat acids are generally polymerized by somewhat different techniques than those described in U.S. Patent 3,157,681, but because of the functional similarity of the polymerization products, they are considered equivalent to those prepared by the methods described as applicable to the ethylenically and acetylenically unsaturated fat acids. While saturated acids are difficult to polymerize, polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic, stearic acid, arachidic acid, behenic acid and lignoceric acid.

The ethylenically and acetylenically unsaturated fat acids which may be polymerized and their method of polymerization are described in the above mentioned U.S. Patent 3,157,681.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined by conventional gas-liquid chromatography of the corresponding methyl esters. Another method of determination is a micromolecular distillation analytical method. This method is that of R. F. Paschke et al., J. Am. Oil Chem. Soc., XXXI (No. 1), 5, (1954), wherein the distillation is carried out under high vacuum (below 5 microns) and the monomeric fraction is calculated from the weight of product distilling at 155° C., the dimeric fraction calculated from that distilling between 155° C. and 250° C., and the trimeric (or higher) fraction is calculated based on the residue. Unless otherwise indicated herein this analytical method was that employed in the analysis of the polymeric fat acids employed in this invention. When the gas-liquid chromatography technique is employed a portion intermediate between monomeric fat acids and dimeric fat acids is seen, and is termed herein merely as "intermediate," since the exact nature thereof is not fully known. For this reason, the dimeric fat acid value determined by this method is slightly lower than the value determined by the micromolecular distillation method. Generally, the monomeric fat acid content determined by the micromolecular ditsillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

As earlier indicated, the polymeric fat acids employed to prepare the polyamides used in this invention have a dimeric fat acid content in excess of 90% by weight and preferably in excess of 95% by weight. Such polymeric fat acids are obtained by fractionation by suitable means such as high vacuum distillation or by solvent extraction techniques from polymeric fat acids having lower dimeric fat acid contents, such as the common commercially available products described earlier.

With polymeric fat acids having the dimeric fat acid content in excess of 90%, the polyamide products therefrom will desirably have molecular weights in excess of 10,000 and preferably in excess of 15,000–20,000.

The polyamides are prepared by reacting the polymeric fat acids with a diamine. The resins may also include other copolymerizing acid and amine components and the diamine employed may be a single diamine or a mixture of two different diamines. In addition, small amounts of monomeric, monocarboxylic acids may be present. With regard to any of the acid components, any of the equivalent amide forming derivatives thereof may be employed, such as the alkyl and aryl esters, preferably alkyl esters having from 1 to 8 carbon atoms, the anhydrides or the chlorides.

The diamines employed may be aliphatic, cycloaliphatic or aromatic diprimary diamines, which may be ideally represented by the formula $$H_2N-R-NH_2$$

where R is an aliphatic, cycloaliphatic or aromatic hydrocarbon radical preferably having from 2 to about 40 carbon atoms. Representative of such diamines are ethylene diamine, 1,2-diaminopropane, 1,3-diaminopropane, 1,3-diaminobutane, tetramethylene diamine, pentamethylene diamine, hexamethylene diamine, decamethylene diamine, octadecamethylene diamine, metaxylylene diamine, para-xylylene diamine, cyclohexylene diamine, bis(aminoethyl) benzene, cyclohexyl bis(methyl amine), diamino-dicyclohexyl methane, methylene dianiline and dimeric fat diamine. The diamine may be employed alone or mixtures of two or more may be employed. The most preferred diamines are the alkylene diamines in which the alkylene group has from 4–6 carbon atoms and mixtures thereof with dimeric fat diamine (preferably having 36 carbon atoms).

The dimeric fat diamine, sometimes referred to as "dimer diamine," "dimeric fat amine," or "polymeric fat acid diamine" are the diamines prepared by amination of dimeric fat acids. Reference is made thereto in U.S. Patent 3,010,782. As indicated therein, these are prepared by reacting polymeric fat acids with ammonia to produce the corresponding nitriles and subsequently hydrogenating the nitriles to the corresponding amines. Upon distillation, the dimeric fat diamine is provided which has essentially the same structure as a dimeric fat acid except that the carboxyl groups are replaced by $-CH_2NH_2$ groups. Further, this diamine is also described in Research and Development Products Bulletin, CDS 2–63 by General Mills, Inc., June 1, 1963, as "Dimer Diamine," illustrated by the formula $H_2N-D-NH_2$ where D is a 36-carbon hydrocarbon radical of a dimeric fat acid.

The copolymerizing compounds commonly employed are aliphatic, cycloaliphatic or aromatic dicarboxylic acids or esters which may be defined ideally by the formulae:

$$R_1OOC-COOR_1$$

and $$R_1OOC-R'-COOR_1$$

where R' is an aliphatic, cycloaliphatic or aromatic hydrocarbon radical preferably having from 1 to 20 carbon atoms and $R_1$ is hydrogen or an alkyl group (preferably having from 1 to 8 carbon atoms). Illustrative of such acids are oxalic, malonic, adipic, sebacic, suberic, pimelic, azelaic, succinic, glutaric, isophthalic, terephthalic, phthalic acids, naphthalene dicarboxylic acids and 1,4- or 1,3-cyclohexane dicarboxylic acid.

Other copolymerizing reactants may be amino acids or the corresponding lactams represented by the following formula $$H_2N(CH_2)_xCOOH$$

where $x$ is an integer from 2 to 15, the corresponding lactams being represented by the formula

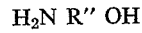

In general, the most common amino acids or corresponding lactams are aminocaproic acid (or epsilon caprolactam), aminoundecanoic acid and omega caprylactam where $x$ is 5, 10, and 7 respectively.

Other difunctional coreactants are the monoalkanol amines which may ideally be represented by the formula $$H_2N\ R''\ OH$$

where R'' is a divalent aliphatic hydrocarbon radical, desirably having from 2 to 8 carbon atoms and preferably an alkylene radical having from 2 to 8 carbon atoms such as monoethanolamine, propanolamine, butanolamine, 2-amino-3-hexanol, 2-amino-4-pentanol, 5-amino-4-octanol, 3-amino-3-methyl-3-butanol. Where an alkanol amine is employed, a polyesterpolyamine product is provided.

Essentially molar equivalent amounts of carboxyl and amine groups are employed in preparing the polyamide. Where an alkanol amine is employed, the carboxyl groups employed are essentially equivalent to the amine plus hydroxyl groups. Where copolymerizing dicarboxylic acids or amino acids are employed, it is preferred that the carboxyl groups from the polymeric fat acid should account for at least 50 equivalent percent of the total carboxyl groups present. Also, where an alkanol amine or amino acid is employed, it is preferable that the amine groups from the diprimary diamine or diamines should account for at least 50 equivalent percent of the total amine groups present.

The safety glass of the present invention consists essentially of two or more pieces of glass with transparent polyamide resin interlayers. When breakage occurs, the glass fragments tend to adhere to the interlayer and the edges are less likely to be jagged than with ordinary glass.

The laminates of the present invention show good appearance and ability to adhere together. For screening the materials, a drop ball test (impact) is used. This is a modified drop ball test method substantially as described in "The American Standard Safety Code for Safety Glazing Materials for Glazing Motor Vehicles Operating on Land Highways," Z 26.1–1950. Because of availability of equipment, the test was modified unless otherwise indicated as follows:

(a) Glass plates 6 in. by 6 in. were used instead of 12 in. by 12 in.

(b) A 0.5 lb. ball (smooth steel sphere) was dropped from a height of 36 feet instead of the specified 30 ft.

In some instances an adhesion test was also conducted.

For this test, a 1⅛ in. square (3-piece sandwich) is secured to the jigs of an Instron tester and the adhesive properties are determined by attempting to pull the two glass plates apart.

In evaluating the present invention, safety glass plates were prepared as described hereinbelow, unless otherwise indicated.

Glass plates, 6 in. by 6 in. by ⅛ in., were washed with soap and water, rinsed several times in distilled water, washed with methanol, wiped dry and placed in a vacuum oven at 40° C. for about 14 hours. The plates were then stored in a dessicator.

Safety glass was prepared by interposing the polyamide resin interlayer between two glass plates forming a three piece sandwich. The polyamide resin interlayer was interposed in the form of an extruded rod or sheet or a sheet molded from the groanulated polyamide resin (6 in. by 6 in. by 0.018 in.). In some instances, the polyamide resin was interposed by evenly distributing ground polyamide resin directly between the two glass plates.

The three piece sandwich was then heated to result in a bonded product of two glass plates adhered through the polyamide resin interlayer. The heating was generally conducted in the following three manners.

(a) The sandwich was heated in a vacuum oven.
(b) The sandwich was heated on a hot plate.
(c) The sandwich was heated on a hydraulic press.

By applying pressure to the top plate of the sandwich, such, as, weighting the sandwich down with additional glass plates, there was less tendency to form air bubbles and adhesion was improved.

The polyamides were prepared by heating the reactants at temperatures in the range of 100 to 300° C. for from 3 to 6 hours, the last 1 to 2 hours being conducted under vacuum or reduced pressure (<1 mm. Hg). A typical heating schedule would appear as follows:

Heating up to 150° C. over about 0.5 hour, heating from 150 to 200° C. over about 2–3 hours, heating from 200 to 275° C. over about 1 to 2 hours, and maintaining the temperature at about 275° C. for 1 to 3 hours under reduced pressure. In general, the reactants are preferably heated to about 200° C. and maintained at from 200 to 300° C. (preferably 250 to 275° C.) for about 3–4 hours, the last 1 to 2 hours under vacuum. All of the polyamide resins employed herein were prepared in this general manner which comprises general known amidification conditions.

The following examples will serve to best illustrate further the spirit and scope of the present invention. These examples are not to be construed as limiting, but merely serve as illustrations of the invention. Percentages and parts are by weight unless otherwise indicated. Also for convenience in illustration, the polymeric fat acids employed in the examples are polymerized tall oil fatty acids except where otherwise indicated.

EXAMPLE I

Polyamide resins were prepared for use as an interlayer or laminating material for safety glass from 1,6-diaminohexane and hydrogenated and distilled polymerized tall oil fatty acids( polymeric fat acids of tall oil acids) by the general method described hereinabove. The polymeric fat acid had the following analysis:

Monomer (M)[1] _____ percent__ 0.6
Dimer (D)[1] _____ do____ 99.1
Trimer (T)[1] _____ do____ 0.3
Saponification equivalent (S.E.) _____ 285
Neutralization equivalent (N.E.) _____ 290

[1] By gas-liquid chromatography (any intermediate present is reported as dimer).

Specifically the reaction conditions were as follows: Into a stainless steel reactor equipped with a stirrer, thermocouple and a distillation head were placed 566 gm. (2.0 equivalents) of the polymeric fat acids and 116.2 gm. (2.0 equivalent) of 1,6-diaminohexane.

The mixture was heated over 1 hours to 155° C. and over 0.5 hr. to 170° C. The reaction was then conducted over 1 hours to 200° C., 0.5 hour at 200–250° C., under vacuum for 0.25 hr. at 250° C., and under vacuum at 270° C. for 65 minutes.

The resulting polyamide product had the following analysis:

Amine value (meq./kg.) _____ 36
Acid value (meq./kg.) _____ 30
Inherent vicosity (0.5 g./100 ml., m-cresol) ____ 0.47
Ball and ring softening point, °C. _____ 111

Safety glass units were prepared as described hereinabove and more specifically hereinbelow, each of which satisfactorily passed the impact-ball test eariler described indicating the utility as a safety glass structure.

| Sample | Form | Heating Conditions |
|---|---|---|
| A | Sheet | 6 hrs. at 71° C., 1 hour to 121° C., 2 hours at 121° C. |
| B | Sheet | 4.75 hrs. at 71° C., 1 hr. to 121° C., 2 hrs. at 121° C., weight added. |
| C | Sheet | 5 hrs. at 71° C., 1 hr. to 121° C., 2 hrs. at 121° C., 735 gms. weight added. |
| D | Grindings between plates | Pasadena hydraulic press 2,500 gm. weight added. |
| (1) | do | 280° F. |
| (2) | do | 400° F. |
| (3) | do | 360° F. |
| E | Sheet | 4 hrs. at 140° C. |
| F | Grindings | Pasadena hydraulic press no weight, 425° F. |
| G | Sheet | Hot plate. |
| (1) | do | 245° C. for 4 hrs. weight added. |
| (2) | do | 220° C. for 4 hrs. no weight. |
| (3) | do | 140° C. for 3 hrs. no weight. |
| (4) | do | 140° C. for 3 hrs. 755 gm. weight. |
| H | {Sheet | 4 hrs. at 82° C. |
|   | {do | 3 hrs. at 180° C. |
| I | Sheet | Vacuum oven; 82° C. for 4 hrs., raised to 180° C. for 3 hrs. |

EXAMPLE II

Glass laminates employing 6 in. by 6 in. by ⅛ in. plate glass, were prepared by molding pieces of extruded rod between glass plates and then compression molding the resin to a 15 mil film employing a temperature of about 350° F.

The samples were exposed in an Atlas twin arc Weather-Ometer and removed periodically for color checks. At about 3000 hours, no significant changes in color were noted in the samples using a resin similar to that of Example I (polyamide A) as determined on a Hunter multipurpose reflectometer. The specific results are as follows, including the results for other polyamide resins evaluated.

| | Original color | Color after 728 hours | Color after 1,549 hours | Color after 2,982 hours |
|---|---|---|---|---|
| Polyamide: | | | | |
| A[1] | −2.2 | −5.0 | | −4.8 |
| B[2] | −0.9 | −2.8 | | |
| C[3] | +1.6 | −2.0 | −0.8 | |
| D[4] | −0.4 | −3.9 | −2.5 | |

[1] Polyamide of 1,6-diaminohexane and hydrogenated and distilled polymeric fat acids of tall oil acids (percent M=1.9; percent I=2.2; percent D=94.6; percent T=1.3; saponification value=197; acid value=192).
[2] Polyamide of 4,4′-diamino-3,3′-dimethyldicyclohexylmethane and hydrogenated and distilled polymeric fat acids of tall oil acids having the analysis (percent M=0.1; percent I=3.2; percent D=96.2; percent T=0.5; acid value=192; saponification value=196).
[3] Polyamide of 1,6-diaminohexane, sebacic acid (25 wt. percent) and hydrogenated and distilled polymeric fat acid of tall oil acids (75 wt. percent) having the analysis (percent M=0.9; percent I=1.9; percent D=96.6; percent T=0.6; acid value=192; saponification value=197).
[4] Polyamide of 1,6-diaminohexane, suberic acid (25 wt. percent) and hydrogenated and distilled polymeric fat acids of tall oil acids (75 wt. percent) having the analysis (percent M=1.7; percent I=2.1; percent D=95.0; percent T=1.2; acid value=192; saponification value=196).

EXAMPLE III

The polyamide interlayer or interlaminar layers of polyamide C and Example I were then separated from the glass after exposure and the properties were determined. The values as compared to the original polymer as shown by the percent retention column can be seen from the following Table I.

TABLE I

| Polyamide: | Yield Strength, p.s.i. | Percent Retention | Ultimate Tensile Strength, p.s.i. | Percent Retention | Percent Elongation | Percent Retention |
|---|---|---|---|---|---|---|
| A | 2,210 | 130 | 4,375 | 110 | 550 | 110 |
| C | 3,240 | 150 | 4,650 | 82 | 330 | 78 |

EXAMPLE IV

The change in luminous transmittance due to aging was estimated. The American Standard Safety Code for Safety Glazing Materials (Test 5–1) requires at least 70% retention of original luminous transmittance after 100 hours exposure in a Uviarc or Copper Hewitt-type exposure device. After 2982 hours in the Atlas twin carbon arc Weather-Ometer, the following results were found for the polyamide product of Example I.

| | $T_2$ (Estimate) [1] | Percent Retention $T_2$ (Estimate) |
|---|---|---|
| Hours Exposed: | | |
| 0 | 0.93 | |
| 2,982 | 0.82 | 88 |

[1] If $T_2$=1.00, Transmission=100%; $T_2$=0, Transmission=0%.

EXAMPLE V

A. Preparation of the copolyamide

Into a stainless steel reactor were placed 333.9 g. (1.8 equivalents) of hydrogenated distilled polymeric fat acid of tall oil acids that analyzed as follows (gas-liquid chromatography):

| | |
|---|---|
| M | percent 0.9 |
| I | do 1.8 |
| D | do 96.6 |
| T | do 0.7 |
| Saponification value | 198 |
| Acid value | 193 |

79.87 g. (0.7 equivalent) of dimethyl 1,4-cyclohexanediacetate and 120.51 g. (1.88 equivalents) of 1,6-diaminohexane.

The mixture was heated with agitation 0.5 hr. at 30 to 150° C., 2.5 hrs. at 150–200° C., 1.5 hrs. at 200 to 275° C. and then 2 hrs. at 275° C. under reduced pressure (<1 mm. Hg). The resulting product analyzed as follows:

| | |
|---|---|
| Amine (meq./kg.) | 25 |
| Acid (meq./kg.) | 28 |
| Ball and ring softening point, ° C. | 177 |
| Polymer melt temp., ° C. | 175 |
| Tensile modulus of elasticity (2% elongation) (p.s.i.) | 1410 |
| Tensile ultimate (p.s.i.) | 6150 |
| Percent elongation | 435 |

B. Preparation of safety glass laminate from VA above

The glass plates were prepared as earlier described hereinabove, except glass plates of 12 in. x 12 in. x 1/8 in. were used. A film of the above polyamide approximately 0.02 inch thick was placed between two glass plates. This sandwich was placed in a steam heated hydraulic press and heated to about 138° C. (until it became molten). At this point slight pressure was applied to the sandwich and the glass laminate was allowed to cool.

The safety glass plate was tested using the drop ball test from a height of 25 feet. The results are as follows:

*At room temperature.*—Multiple cracks. One inch hole at point of impact; the plates held together.

*At 0° F.*—Multiple cracks. Two inch hole at point of impact; plates held together.

EXAMPLE VI

A. Preparation of the polyamide

The procedure is similar to Example VA above. The ingredients were 549.4 g. (1.85 equivalents) of a hydrogenated and distilled dimethyl ester of polymeric fat acid of tall oil acids which analyzed:

| | |
|---|---|
| M | percent 0.7 |
| D | do 99.1 |
| T | do 0.2 |
| S.V. | 194 |
| A.V. | 197 | and 107.5 g. (1.85 equivalents) of 1,6-diaminohexane. The resulting polyamide analyzed as follows:

| | |
|---|---|
| Amine (meq./kg.) | 23 |
| Acid (meq./kg.) | 45 |
| Inh. vis. | 0.57 |
| Ball and ring softening point, ° C. | 101 |
| Tensile modulus of elasticity (2% elongation) (p.s.i.) | 15,000 |
| Tensile ultimate (p.s.i.) | 3,500 |
| Percent elongation | 565 |
| Yield strength (p.s.i.) | 1,330 |

B. Preparation of safety glass laminate from VIA above

Using the procedure of VB above the drop ball test gave the following results:

*At room temperature.*—The glass did not break but it did crack in several places. At the point of impact a one inch center resulted with ground glass fragments adhering to the polyamide.

*At 0° F.*—The glass broke into five pieces with no recovery of the center piece.

EXAMPLE VII

A. Preparation of the polyamide

The procedure is similar to Example VA above. The ingredients were 339 g. (1.18 equivalents) of hydrogenated distilled polymeric fat acid of tall oil acids which analyzed:

| | |
|---|---|
| M | percent 0.7 |
| D | do 99.1 |
| T | do 0.2 |
| S.V. | 194 |
| A.V. | 197 |

79.87 g. (0.7 equivalent) dimethyl 1,4-cyclohexanediacetate and 120.51 g. (1.88 equivalents) of 1,6-diaminohexane. The resulting polyamide analyzed as follows:

| | |
|---|---|
| Amine (meq./kg.) | 26 |
| Acid (meq./kg.) | 66 |
| Inh. vis. | 0.64 |
| Ball and ring softening point, 0° C. | 122 |
| Polymer melt temperature, ° C. | 135 |
| Modulus | 5450 |
| Tensile ultimate | 5800 |
| Percent elongation | 388 |
| Yield strength | 870 |

B. Preparation of safety glass laminate from VIIA above

Using the procedure of VB above the drop ball test gave the following results:

*At room temperature.*—Broke into 4 pieces. At the point of impact a one-inch center piece resulted with adhering glass fragments.

As described hereinabove, it is apparent that a safety glass structure or laminate can be prepared employing an interlayer consisting essentially of a polymeric fat acid polyamide wherein the polymeric fat acid has a dimeric fat acid content in excess of 90% by weight. The composition may be modified with other copolymerizing compounds to provide specific differences in physical properties which may be desired. Other ingredients may be added which do not affect the basic composition including plasticizers, fillers, dyes or pigments. While these may affect the properties to some extent, they do not materially change the properties of the basic polyamide resin material.

The embodiments of the invention in which an exclusive property or privilege is claimed are defined as follows.

We claim:

1. A glass unit comprising at least two sheets of glass and an interposed layer of a thermoplastic polymeric fat acid polyamide resin, said polymeric fat acid having a dimeric fat acid content greater than 90% by weight.

2. A glass unit as defined in claim 1 wherein said polymeric fat acid has a dimeric fat acid content greater than 95% by weight.

3. A glass unit as defined in claim 1 in which said polyamide is the amidification product of said polymeric fat acid and diamine of the formula H$_2$NRNH$_2$ where R is selected from the group consisting of aliphatic, cycloaliphatic, and aromatic, hydrocarbon radicals, essentially equivalent amounts of carboxyl and amine groups being employed.

4. A glass unit as defined in claim 3 wherein said diamine is ethylene diamine.

5. A glass unit as defined in claim 3 wherein said diamine is hexamethylene diamine.

6. A glass unit as defined in claim 3 wherein a mixture of diamines is employed, said mixture consisting essentially of a mixture of an alkylene diamine having from 4 to 6 carbon atoms and a dimeric fat diamine having about 36 carbon atoms.

7. A glass unit as defined in claim 3 in which said polyamide is the amidification product of polymerized tall oil fatty acids.

8. A glass unit as defined in claim 3 in which said amidification product is prepared by heating said polymeric fat acid and diamine at a temperature in the range of 100 to 300° C.

9. A glass unit as defined in claim 1 in which said polymeric fat acid is a polymerized fat acid, said fat acid being a monocarboxylic, aliphatic hydrocarbon acid having from 8 to 24 carbon atoms.

10. A glass unit as defined in claim 7 wherein said fat acid is a mixture of oleic and linoleic acids.

11. A glass unit as defined in claim 7 in which said fat acid contains 18 carbon atoms.

12. A glass unit as defined in claim 1 in which said polyamide is the amidification product of said polymeric fat acid, a diamine of the formula H$_2$NRNH$_2$, and a copolymerizing dicarboxylic compound selected from the group consisting of R$_1$OOC—COOR$_1$ and $$R_1OOCR'COOR_1$$

where R and R' are selected from the group consisting of aliphatic, cycloaliphatic, and aromatic hydrocarbon radicals, and R$_1$ is selected from the group consisting of hydrogen and an alkyl group having from 1 to 8 carbon atoms, essentially equivalent amounts of carboxyl and amine groups being employed.

13. A glass unit as defined in claim 12 in which said dicarboxylic compound is sebacic acid.

14. A glass unit as defined in claim 12 in which said dicarboxylic compound is adipic acid.

15. A glass unit as defined in claim 12 in which said dicarboxylic compound is dimethyl 1,4-cyclohexanediacetate.

16. In a process of forming a glass unit of at least two sheets of glass with an interposed layer of a thermoplastic material comprising heating said glass and interlayer unit above the softening temperature of said interlayer and subsequently cooling to a temperature below the softening point of said interlayer, the improvement consisting of employing as said interlayer, a polymeric fat acid polyamide, said polymeric fat acid having a dimeric fat acid content in excess of 90% by weight.

References Cited

UNITED STATES PATENTS 3,145,195  8/1964  Tsou _____ 161—197
3,253,940  5/1966  Robbinsdale _____ 260—18

ROBERT F. BURNETT, *Primary Examiner.*

WILLIAM J. VAN BALEN, *Assistant Examiner.*

U.S. Cl. X.R.

156—106, 331, 332; 260—18